July 31, 1945.  J. PIGNONE  2,380,610
CAMERA
Filed Aug. 21, 1940
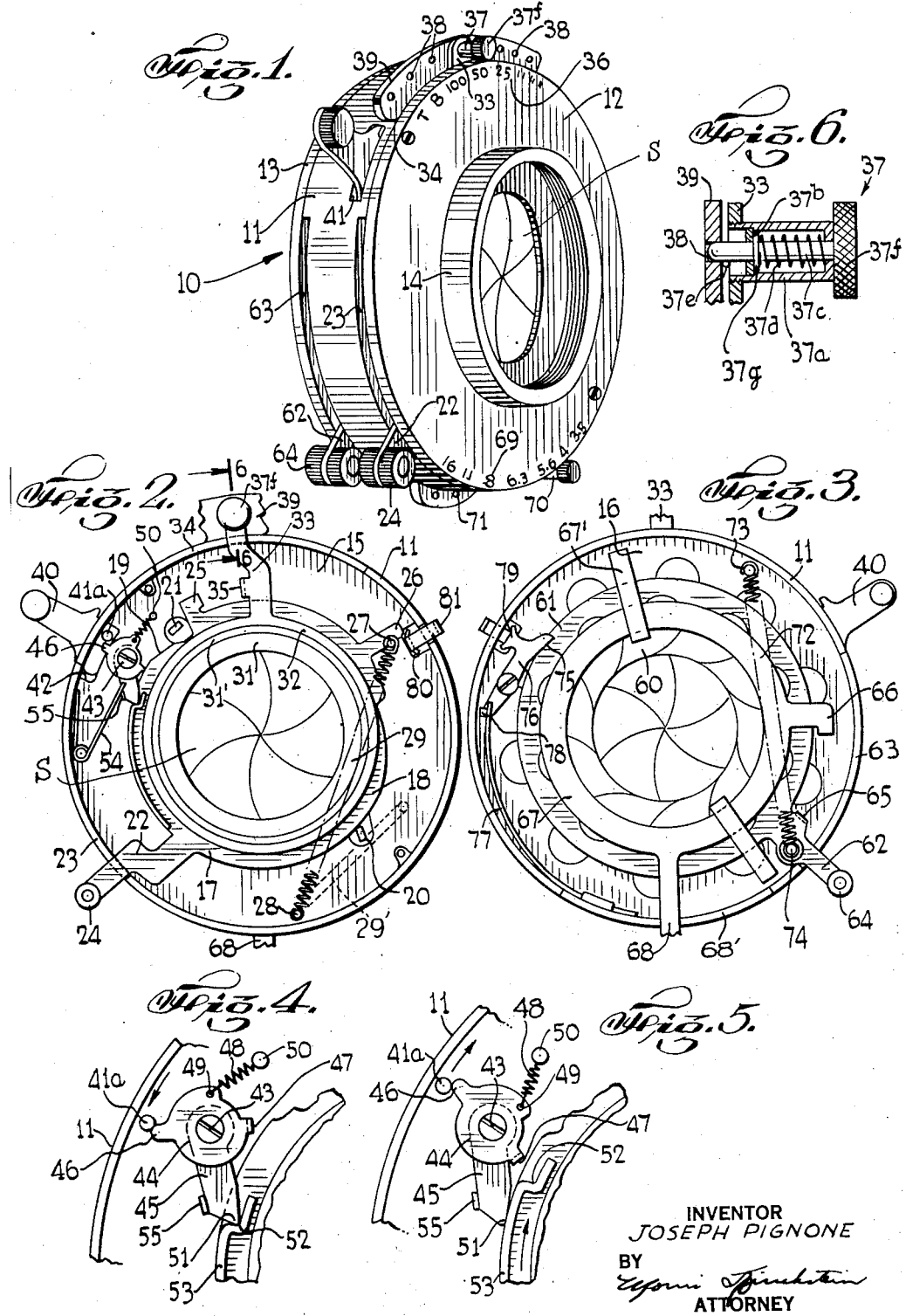
INVENTOR
JOSEPH PIGNONE
BY
ATTORNEY Patented July 31, 1945

2,380,610

UNITED STATES PATENT OFFICE 2,380,610

CAMERA

Joseph Pignone, Brooklyn, N. Y., assignor to Universal Camera Corporation, New York, N. Y., a corporation of Delaware Application August 21, 1940, Serial No. 353,484

16 Claims. (Cl. 95—64)

This invention relates to cameras.

It is particularly directed to cameras wherein the viewing optical system employs the objective lens of the photographic optical system, such as for example a reflex camera, a camera having a grounded glass back-viewing screen or the like.

It is customary when using a camera of the character described to set the diaphragm associated with the objective lens at maximum aperture in order to most conveniently view and focus the object on the viewing screen. It is also common practice, in order to obtain a good depth of field or fine detail, when employing a high speed film emulsion or relatively slow shutter speeds, to stop down the diaphragm aperture employed in photographing a scene.

Accordingly, with the ordinary camera of the type aforementioned, it is necessary to set the diaphragm at its maximum aperture while viewing and focusing and to then manually reduce the diaphragm setting to the proper opening which the operator considers most desirable for photographing a specific object. This presents a considerable disadvantage, in that additional time for handling is thus involved in stopping down the aperture after a scene has been satisfactorily framed and focused. While this may be avoided in some cases by initially setting the diaphragm to the smaller aperture, the difficulty is then presented that an insufficient amount of light is transmitted at small apertures.

Accordingly, one of the objects of my invention is to provide in a camera of the character described a highly practical and efficient diaphragm pre-selecting means which, simply by operation of the cocking arm, will automatically open the diaphragm to maximum aperture during viewing and will automatically stop it down to a pre-selected aperture opening prior to exposure.

Another object of this invention is to provide novel means for automatically pre-selecting the shutter speed.

A further object of this invention is to provide in a camera of the character described a shutter pre-selecting means wherein by operation of the releasing arm the shutter is automatically opened during viewing, closed between viewing and exposure, and re-opened for a pre-selected exposure period.

An additional object of this invention is to provide in a camera of the character described combined shutter speed and diaphragm aperture opening pre-selecting mechanisms in association with the objective lens.

It is also an object of this invention to provide in a camera of the character described combined shutter speed and diaphragm aperture opening pre-selecting mechanisms, which shall be economical to manufacture, rugged in construction and extremely simple to operate.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the appended claims.

In the accompanying drawing, in which is shown one of the various possible embodiments of this invention, Fig. 1 is a perspective view of a combined shutter and diaphragm unit embodying my invention;

Fig. 2 is a front elevational view thereof, with the front cover plate removed;

Fig. 3 is a rear elevational view thereof with the rear cover plate removed;

Figs. 4 and 5 are enlarged detail views of the releasing mechanism showing various stages in its cycle of operations; and Fig. 6 is an enlarged detail sectional view taken along line 6—6 of Fig. 2.

Referring now in detail to the drawing, I have illustrated a housing 10 within which the shutter and diaphragm mechanisms embodying my invention are contained. Said housing comprises an open-ended cylindrical casing 11 having front and back cover plates 12 and 13, suitably attached thereto. The front cover plate 12 is centrally apertured and provided with an annular internally threaded flange 14, such as is customarily employed in the art, to attach the housing to an objective lens or other portion of a camera. The rear cover plate 13 is likewise apertured and provided with a similar internally threaded flange (not shown).

Disposed within the casing 11 are a pair of spaced transverse supporting walls 15 and 16 having aligned central apertures. Between these walls 15 and 16 I mount a standard, adjustable speed shutter S, such as for example a six-plate iris shutter whose speed is adapted to be regulated by a cam ring 17 of the usual type. The cam ring 17 serves as a drive ring for regulating the shutter and overlies the forward face of the front wall 15. The ring 17 is provided with a sloping cam surface 18 which cooperates with a shutter extension arm 20 for varying the instantaneous speeds, and a step cam surface 19 which cooperates with another shutter extension arm 21 to provide an instantaneous, bulb or time exposure.

A shutter loading arm 22 is integrally formed with the cam ring 17 and freely projects beyond the housing 10 through a marginal recess 23 in the casing 11. On the free end of the arm 22 there may be disposed a pair of knurled cylinders 24 for convenience in manually operating said arm in a manner hereinafter described. The cam ring 17 is also provided with a stop limiting arm 25 and a tripping arm 26 wholly contained within the housing 10. Tensioned between a pair of studs 27 and 28, mounted on the tripping arm 26 and the front wall 15, is a helical drive spring 29 which urges the shutter drive ring 17 in a clockwise direction.

The cam ring 17 and an adjacent setting ring 32 may be conveniently journalled on a stub sleeve 31 attached to the front wall 15, being maintained in slidably contacting relation by a nut 31' screw threaded on the forward end of the sleeve 31 and abutting the setting ring 32.

A shutter selecting arm 33, formed integrally with the setting ring 32, projects freely beyond the housing 10 through a marginal recess 34 in the casing 11, and said arm 33 is provided with a rearwardly extending stop finger 35 which is disposed in arcuate alignment with the stop limiting arm 25. The front cover plate 12 has the usual shutter speed indicating numerals 36 marginally imprinted over the arc of travel of the arm 33. In order to maintain the arm 33 and ring 32 in any position corresponding to a desired shutter speed, suitable means such as a spring mounted finger 37 may be carried on the exteriorly projecting end of the arm 33 for selective cooperation with a plurality of mating holes 38 in a segmental flange 39 formed on the casing 11.

The spring finger 37 comprises a tubular cup 37a (Fig. 6) threaded on the arm 33 and having an interior transverse wall 37b provided with a central aperture which is aligned with the aperture in the top wall of the cup 37a. Said apertures freely receive a shaft 37c whose free end fits in the holes 38. The shaft 37c is urged forwardly by a spring 37d compressed between the top wall of the cup 37a and a collar 37g pressed on the shaft 37c. A nub 37e is formed on the shaft 37c to limit the travel of the shaft when pulled forwardly by the knurled knob 37f. The rearward motion of the shaft 37c is limited by abutment of collar 37g against the wall 37b.

The shutter S is provided with the usual release lever 40 which projects exteriorly of the housing 11 through a slot 41 and carries a release pin 41a which extends through a peripheral slot 42 in the front wall 15. Means is provided to coact with the release pin 41a upon actuation of the release lever 40 to cause the shutter and diaphragm pre-selecting mechanisms to successively pass through the various stages of their operation. Such means comprises a pivot 43 which is mounted on the front wall 15 and rotatably supports a release disc 44 and a pawl 45. The release disc 44 has a coplanar finger 46, whose path of travel intersects the path of travel of the release pin 41a and is also provided with a rearwardly projecting finger 47 adapted to abut an edge of the pawl 45. Said disc 44 is normally maintained with the finger 46 disposed radially of the casing 11, as shown in Fig. 2, by a spring 48 tensioned between an aperture 49 in the release disc 44 and a pin 50 on the front wall 15. The pawl 45 has a pointed free end 51 for engaging a recess 52 in a marginal sector flange 53 on the drive ring 17 to lock the same in loaded position. Said pawl 45 is constantly urged in a counter-clockwise latching direction by a hair pin spring 54 suitably supported on the front wall 15 and engaging a nub 55 on said pawl.

Disposed on the rear wall 16 is a standard iris type diaphragm comprising a plurality of interleaving plates 60 pivotally mounted on a drive ring 61 and pivotally attached to the rear wall 16. Said drive ring 61 is provided with a loading arm 62 which freely projects beyond the housing 10 through a marginal recess 63 in the casing 11 and carries on its free end a pair of knurled cylindrical members 64 for manually operating the same.

A forwardly extending stop limiting arm 65 is formed integrally with the loading arm 62 and is adapted to engage an arcuately aligned stop finger 66 on a setting ring 67, rotatably held by a plurality of straps 67'. This latter ring 67 carries a diaphragm setting arm 68 which freely projects through a marginal recess 68' in the casing 11. The front cover plate 12 is provided with numerals 69 for indicating the setting of the arm 68 and holes 71 which cooperate with spring mounted finger 70 (similar to the finger 37) on arm 68 to retain the said arm in any selected position.

A drive spring 72, which constantly urges the drive ring 61 in a clockwise direction (viewed from the front of the housing 10) is tensioned between a pair of pins 73 and 74 on the rear wall 16 and loading arm 62.

In order to latch the drive ring 61 in loaded position, I provide a recess 75 in the periphery of the ring 61 which is adapted to engage a detent lever 76 pivotally mounted on the rear wall 16. The said lever 76 is urged into latching position by a flat spring 77 disposed on the side wall of the casing 11 with its free end pressing against a nub 78 on the detent lever 76.

The detent lever 76 is also provided with an integral strip 79 having a portion 80 projecting forwardly through apertures in the front and rear walls 15 and 16 to abut the end of the tripping arm 26 on the cam ring 17 when the same is in loaded position. The face of the portion 80 which abuts the arm 26 is sloped, as is clearly indicated in Fig. 2. At the end of the portion 80 the strip 79 is bent outwardly so as to project beyond the housing 10 and has a portion 81 disposed parallel to and spaced a short distance away from the casing 11 when the detent lever 76 is in latched position.

In operation, the shutter cam ring 17 is loaded by rotating the loading arm 22 in a counter-clockwise direction from its position abutting the upper end of the slot 23 to the position shown in Figs. 1 and 2. When the shutter cam ring 17 reaches this position, the pawl 45, urged by the hairpin spring 54, drops into the groove 52 with its pointed end 51 resting in the lowermost corner of the groove, as clearly shown in Fig. 4. The cam ring 17 is thus latched against return movement.

At the same time the drive ring 61 may be similarly loaded by rotating the loading arm 62 in a counter-clockwise direction to its extreme lower position, shown in Figs. 1 and 3, when the detent lever 76, urged by the flat spring 77, will drop into the recess 75, similarly latching the drive ring 61. After the drive rings 17 and 61 are loaded, the portion 80 of the strip 79 will abut the tip of the tripping lever 26, but no pressure will be exerted thereon by the tripping lever 26.

When the drive rings 17 and 61 are loaded, the drive springs 29 and 72 will be stretched from their unloaded condition, indicated by the dotted drive spring 29' in Fig. 2, to store the required energy to rotate the said rings during the later stages of their operation.

When the various parts are in their loaded positions, shown in Figs. 2 and 3, it will be seen that the extension arm 21, which controls the instantaneous, bulb and time exposures of the shutter, will be aligned with the portion of the stepped cam 19 which corresponds to a time exposure. Also the drive ring 61 has set the diaphragm at its maximum aperture.

The release lever 40 is now depressed to its lower shutter actuating position, thus moving the pin 41a into engagement with the finger 46 to rotate the release disc 44 in a counter-clockwise direction and move the projecting finger 47 away from the pawl 45, as shown in Fig. 4. When the lever 40 reaches said actuating position, the shutter will open and the extension arm 21 will drop into the time recess of cam surface 19, allowing the shutter to remain open until further actuation of the release lever 40. At the same time, as soon as the pin 41a has moved past the finger 46, the disc 44 will rotate in a clockwise direction under the action of the spring 48 into normal position, with the finger 46 pointing radially outward and the projecting finger 47 adjacent the pawl 45.

The subject being photographed may now be viewed through an exposure meter to determine the desired shutter speed and diaphragm opening. The exposure meter readings are then transferred to the setting rings 32 and 67 by rotating the shutter and diaphragm setting arms 33 and 68 until they are in alignment with a numeral corresponding to the selected speed and opening, the spring fingers 37 and 70 being permitted to drop into the proper holes 38 and 71. This motion of the setting arms will position the stop fingers 35 and 66 a predetermined angular distance away from the stop arms 25 and 65.

The subject is then properly framed on the viewing screen of the camera and properly focused to the desired degree of sharpness.

The release arm 40 is then depressed and allowed to complete its upward stroke on the time setting. As the release arm 40 moves upwardly, the pin 41a will again engage the finger 46, rotating the disc 44 in a clockwise direction and causing the rearwardly projecting finger 47 to lift the pawl 45 out of engagement with the groove 52, thus unlatching the cam ring 17. As soon as the cam ring 17 is unlatched, the drive spring 29 will rotate it in a clockwise direction until the stop limiting arm 25 strikes the stop finger 35, thus disposing the cam slopes 18 and 19 in the desired position relative to the shutter extension arms 20 and 21 to set the shutter at the pre-selected shutter speed.

Also, as soon as the cam ring 17 begins to rotate from loaded position, the tripping arm 26 will ride on the sloped surface of the portion 80, raising the strip 79 and detent 76 and allowing the drive ring 61 to begin its rotation. The drive ring 61 will continue to rotate until its stop limiting arm 65 strikes the stop finger 66, setting the diaphragm at its pre-selected aperture opening.

If a back-viewing camera is employed, the operator next inserts the plate or film pack, or if a reflex camera is used the reflexing mirror is moved to photographing position.

The releasing finger 40 is then depressed for exposure. During this latter stroke the pin 41a will engage the finger 46 on its upper and lower sides, causing the disc 44 to rotate first in a counter-clockwise and then in a clockwise direction. However, as the free pointed end 51 of the pawl 44 is resting at this time on the marginal sector flange 53, no unlatching or pawl action will result.

Obviously, if it is desired to dispense with the pre-loading feature of the combined shutter and diaphragm assembly herein described and employ the same as a conventional non-pre-setting single stroke shutter, the loading arms 22 and 62 are not drawn down. Likewise, either the shutter or diaphragm may be pre-set by drawing down only the respective loading arm. In the event that only the diaphragm loading arm 62 is actuated, the same may be released before exposure by lifting the portion 81 upwardly. Also, if it is desired to void the diaphragm pre-setting after loading, the strip portion 81 may be similarly lifted.

Although I have described my invention with reference to an iris type six-plate shutter and an iris type diaphragm, it will be apparent that any other type of shutter and diaphragm which is commonly employed in the art in association with an objective lens may be used without departing from the spirit of my invention.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

What I claim is:

1. For use in a camera wherein either the viewing optical system or the photographic optical system selectively employs the objective lens of the camera, a shutter adapted to be associated with said objective lens having a reciprocable operating member, a diaphragm associated wtih said shutter and having an adjustable aperture, means to open said diaphragm to its maximum aperture for viewing, and means operative upon a return stroke of said member to stop said diaphragm down after viewing and before exposure, whereby upon closing of said shutter after viewing it will be ready for operation with said diaphragm stopped down while said photographic optical system employs said lens.

2. For use in a camera wherein either the viewing optical system or the photographic optical system selectively employs the objective lens of the camera, a shutter adapted to be associated with said objective lens and having a reciprocable operating member, a diaphragm associated with said shutter and having an adjustable aperture, means to preselect a diaphragm aperture, and means to open said diaphragm to its maximum aperture for viewing, means operative upon a return stroke of said member to stop said diaphragm down to said preselected diaphragm aperture after viewing and before exposure, whereby upon closing of said shutter after viewing it will be ready for operation with said diaphragm stopped down while said photographic optical system employs said lens.

3. For use in a camera wherein either the viewing optical system or the photographic optical system selectively employs the objective lens of the camera, a shutter adapted to be associated with said objective lens and having a reciprocable operating member, a diaphragm associated with said shutter, means to vary the diaphragm aperture, said last named means being reciprocable between two extreme positions, a driving mechanism to move said last named means between said two positions, diaphragm aperture preselecting means, means to open said diaphragm to its maximum aperture for viewing, and means operative upon a return stroke of said member to render said driving mechanism effective and to then render said driving mechanism ineffective when said diaphragm aperture varying means is disposed in a position corresponding to a preselected diaphragm aperture, whereby upon closing of said shutter after viewing it will be ready for operation with said diaphragm stopped down while said photographic optical system employs said lens.

4. For use in a camera wherein either the viewing optical system or the photographic optical system selectively employs the objective lens of the camera, a shutter adapted to be associated with said objective lens and having a reciprocable operating member, a diaphragm associated with said shutter, means including a movable member to vary the diaphragm aperture, said second member corresponding to maximum aperture when disposed at one of said extreme positions, a diaphragm aperture preselecting means, means to set said second member in said last mentioned position, a driving mechanism to move said second member from said last mentioned position toward said other extreme position, and means operative upon a return stroke of said member to render said driving mechanism effective and to then render said driving mechanism ineffective when said second member is disposed in a position corresponding to a preselected diaphragm aperture, whereby upon closing of said shutter after viewing it will be ready for operation with said diaphragm stopped down while said photographic optical system employs said lens.

5. For use in a camera wherein either the viewing optical system or the photographic optical system selectively employs the objective lens of the camera, a shutter adapted to be associated with said objective lens and having a reciprocable operating member, a diaphragm associated with said shutter, means to vary the diaphragm aperture, said last named means being reciprocable between two extreme positions, means to move said last named means to one of said extreme positions corresponding to maximum aperture, means to hold said diaphragm aperture varying means at said last named position, a driving mechanism to move said diaphragm aperture varying means from said last named position to said other extreme position, a releasing means adapted to render said holding means ineffective and said driving mechanism effective, diaphragm aperture preselecting means, and means operative upon a return stroke of said member to render said releasing member effective and to then render said driving mechanism ineffective when said diaphragm aperture varying means is disposed in a position corresponding to a preselected diaphragm aperture, whereby upon closing of said shutter after viewing it will be ready for operation with said diaphragm stopped down while said photographic optical system employs said lens.

6. For use in a camera wherein either the viewing optical system or the photographic optical system selectively employs the objective lens of the camera, a shutter adapted to be associated with said objective lens, said shutter being adjustable for several exposure periods including time and a plurality of different instantaneous exposures, said shutter having a reciprocable operating lever, means to select an exposure period for said shutter, means to set said shutter at time exposure while said viewing optical system employs said lens whereby, when said shutter is then opened at time exposure upon a stroke of said lever, a scene to be taken by said camera may be first viewed through said objective lens and open shutter, means to actuate said means for selecting an exposure period for the shutter, and means to render said actuating means operative solely upon a manually-initiated completion of the return stroke of said lever when said shutter is set at time exposure by said time-exposure-shutter-setting means whereby, upon closing of said shutter after viewing, it will be ready for operation at the selected exposure period while said photographic optical system employs said lens.

7. For use in a camera wherein either the viewing optical system or the photographic optical system selectively employs the objective lens of the camera, a shutter adapted to be associated with said objective lens, said shutter being adjustable for several exposure periods including time and a plurality of different instantaneous exposures, said shutter having a reciprocable operating lever and a member movable to different positions to set said shutter at any one of said different exposure periods, means to preselect any one of said exposure periods for said shutter, means to set said shutter at time exposure while said viewing optical system employs said lens whereby, when said shutter is then opened at time exposure upon a stroke of said lever, a scene to be taken by said camera may be first viewed through said objective lens and open shutter, means to move said shutter-setting member to the preselected exposure period, and means to render said last named means operative solely upon a manually-initiated completion of the return stroke of said lever when said shutter is set at time exposure by said time-exposure-shutter-setting means whereby, upon closing of said shutter after viewing, it will be ready for operation at the selected exposure period while said photographic optical system employs said lens.

8. For use in a camera wherein either the viewing optical systm or the photographic optical system selectively employs the objective lens of the camera, a shutter adapted to be associated with said objective lens, said shutter being adjustable for several exposure periods including time and a plurality of different instantaneous exposures, said shutter having a reciprocable operating lever and a member movable to different positions to set said shutter at any one of said different exposure periods, means to preselect any one of said exposure periods for said shutter, driving means associated with said member, means to load said driving means, means operative upon actuation of said loading means to set said shutter at time exposure while said viewing optical system employs said lens whereby, when said shutter is then opened at time exposure upon a stroke of said lever, a scene to be taken by said camera may be first viewed through said objective lens and open shutter, and means to render said driving means effective to move said shutter-setting member to a preselected exposure period solely upon a manually-initiated completion of the return stroke of said lever when said shutter is set at time exposure by said time-exposure-shutter-setting means whereby, upon closing of said shutter after viewing, it will be ready for operation at the selected exposure period while said photographic optical system employs said lens.

9. For use in a camera wherein either the viewing optical system or the photographic optical system selectively employs the objective lens of the camera, a shutter adapted to be associated with said objective lens, said shutter being adjustable for several exposure periods including time and a plurality of different instantaneous exposures, said shutter having a reciprocable operating lever and a member movable to different positions to set said shutter at any one of said different exposure periods, means to preselect any one of said exposure periods for said shutter, said member being reciprocable between two extreme positions, a driving mechanism to move said member between said two positions, means to load said driving mechanism, means operative upon actuation of said loading means to move said member to one extreme position at which said shutter is set at time exposure while said viewing optical system employs said lens whereby, when said shutter is then opened at time exposure upon a stroke of said lever, a scene to be taken by said camera may be first viewed through said objective lens and open shutter, and means to render said driving mechanism effective to move said shutter-setting member solely upon a manually-initiated completion of the return stroke of said lever when said shutter is set at time exposure by actuation of said loading means, said last named means including means to stop the motion of said member in a position corresponding to said preselected exposure period whereby, upon closing of said shutter after viewing, it will be ready for operation at the selected exposure period while said photographic optical system employs said lens.

10. For use in a camera wherein either the viewing optical system or the photographic optical system selectively employs the objective lens of the camera, a shutter adapted to be associated with said objective lens, said shutter being adjustable for several exposure periods including time and a plurality of different instantaneous exposures, said shutter having a reciprocable operating lever and a member movable to different positions to set said shutter at any one of said different exposure periods, means to preselect any one of said exposure periods for said shutter, said member being reciprocable between two extreme positions, a driving mechanism to move said member between said two positions, means to load said driving mechanism, means operative upon actuation of said loading means to move said member to one extreme position at which said shutter is set at time exposure while said viewing optical system employs said lens whereby, when said shutter is then opened at time exposure upon a stroke of said lever, a scene to be taken by said camera may be first viewed through said objective lens and open shutter, and means to render said driving mechanism effective to move said shutter-setting member solely upon a manually-initiated completion of the return stroke of said lever when said shutter is set at time exposure by actuation of said loading means, said last named means including means to render said driving mechanism ineffective when said member is disposed in a position corresponding to said preselected exposure period whereby, upon closing of said shutter after viewing, it will be ready for operation at the selected exposure period while said photographic optical system employs said lens.

11. For use in a camera wherein either the viewing optical system or the photographic optical system selectively employs the objective lens of the camera, a shutter adapted to be associated with said objective lens, said shutter being adjustable for several exposure periods including time and a plurality of different instantaneous exposures, said shutter having a reciprocable operating lever and a member movable to different positions to set said shutter at any one of said different exposure periods, said member being reciprocable between two extreme positions one of which corresponds to time exposure, means to preselect any one of said exposure periods for said shutter, a driving mechanism to move said member between said two positions, means to load said driving mechanism, means operative upon actuation of said loading means to set said member at the extreme position corresponding to time exposure while said viewing optical system employs said lens whereby, when said shutter is then opened at time exposure upon a stroke of said lever, a scene to be taken by said camera may be first viewed through said objective lens and open shutter, means to hold said member at said extreme position corresponding to time exposure, and means to render said holding means ineffective and said driving mechanism effective and to then render said driving mechanism ineffective when said shutter-setting member is disposed in a position corresponding to said preselected exposure period, said last named means being rendered effective solely upon a manually-initiated completion of the return stroke of said lever when said shutter is set at time exposure by actuation of said loading means whereby, upon closing of said shutter after viewing, it will be ready for operation at the selected exposure period while said photographic optical system employs said lens.

12. A shutter as set forth in claim 6 having associated therewith a diaphragm having an adjustable aperture, means to open said diaphragm to its maximum aperture for viewing, and means operative upon a return stroke of the shutter operating lever when the shutter is set at time exposure by the time-exposure-shutter-setting means to stop down the diaphragm after viewing and before exposure.

13. A shutter as set forth in claim 6 having associated therewith a diaphragm having an adjustable aperture, means to open said diaphragm to its maximum aperture for viewing, means operative upon a return stroke of the shutter-operating lever when the shutter is set at time exposure by the time-exposure-shutter-setting means to stop down the diaphragm after viewing and before exposure, and a housing containing the shutter, the diaphragm and the means operative upon completion of the return stroke of the shutter-operating lever to stop down the diaphragm, the means to open said diaphragm to its maximum aperture extending from said housing.

14. A shutter as set forth in claim 7 having associated therewith a diaphragm having an adjustable aperture, means to preselect a diaphragm aperture, means to open said diaphragm to its maximum aperture, and means operative upon the return stroke of the shutter-operating lever when said shutter is set at time exposure by the time-exposure-shutter-setting means to stop said diaphragm down to a preselected diaphragm aperture after viewing and before exposure.

15. A shutter as set forth in claim 7 having associated therewith a diaphragm having an adjustable aperture, means to preselect a diaphragm aperture, means to open said diaphragm to its maximum aperture, means operative upon the return stroke of the shutter-operating lever when said shutter is set at time exposure by the time-exposure-shutter-setting means to stop said diaphragm down to a preselected diaphragm aperture after viewing and before exposure, and a housing containing the shutter, the diaphragm, and the means operative upon the return stroke of the shutter-operating lever to stop down the diaphragm, the preselecting means for the shutter and for the diaphragm and the diaphragm opening means extending from said housing.

16. A shutter as set forth in claim 6 having associated therewith a diaphragm, means to vary the diaphragm aperture, said last named means being reciprocable between two extreme positions corresponding to maximum aperture and minimum aperture, means to set said diaphragm aperture varying means in a position corresponding to maximum aperture, means to hold said diaphragm aperture varying means in said last named position, a driving mechanism to move said diaphragm aperture varying means toward said other extreme position, a releasing mechanism operable upon the return stroke of the shutter-operating lever, when said shutter is set at time exposure by the time-exposure-shutter-setting means, to render said holding means ineffective and said driving means effective, and a diaphragm aperture preselecting means including means for rendering said driving mechanism ineffective when said diaphragm aperture varying means is disposed in a position corresponding to a preselected diaphragm aperture.

JOSEPH PIGNONE.